United States Patent [19]

Tanoue et al.

[11] Patent Number: 4,944,194

[45] Date of Patent: Jul. 31, 1990

[54] BACKUP CONTROL MEANS FOR SHIFT LEVER OF AN AUTOMATIC TRANSMISSION SYSTEMS

[75] Inventors: Akifumi Tanoue; Hiromi Kono; Yuji Satoh, all of Higashi-Matsuyama, Japan

[73] Assignee: Diesel Kiki Co., Ltd., Tokyo, Japan

[21] Appl. No.: 318,715

[22] Filed: Mar. 3, 1989

[30] Foreign Application Priority Data

Mar. 17, 1988 [JP] Japan .................................. 63-61918

[51] Int. Cl.$^5$ ........................ B60K 20/14; G08B 21/00
[52] U.S. Cl. ...................................... 74/335; 340/686
[58] Field of Search .................... 74/335; 340/679, 686

[56] References Cited

U.S. PATENT DOCUMENTS

| 4,702,127 | 10/1987 | Cote | 74/335 X |
| 4,718,307 | 1/1988 | Yabe et al. | 74/335 X |
| 4,722,237 | 2/1988 | McNinch, Jr. | 74/335 X |
| 4,766,774 | 8/1988 | Tamai | 74/335 X |
| 4,796,485 | 1/1989 | Ebina | 74/335 X |

FOREIGN PATENT DOCUMENTS 58-177725 10/1983 Japan .
62-137450 6/1987 Japan .
62-63194 11/1988 Japan .

Primary Examiner—Leslie A. Braun
Assistant Examiner—Harold F. Macris
Attorney, Agent, or Firm—Wenderoth, Lind & Ponack

[57] ABSTRACT

A drive control apparatus of an automatic transmission device for use in automotive vehicles including a shift actuator and a select actuator comprising a pair of fluid pressure actuators capable of displacing a shift lever in right-angled two directions of a shift direction and a select direction, a piston rod and a detection rod capable of being displaced for an equal amount with respect to each other by a working fluid which is to be supplied and discharged to and from the actuators, a plurality of electromagnetic valves for supplying and discharging a working fluid to and from the actuators according to a control signal, a position switch for withdrawably engaging in a detection groove formed in an outer periphery of the detection rod and, when engaged, detaining the piston rod and detecting a control reference position of the actuators and outputting a detection signal thereof, a stroke sensor for continuously detecting displacement of the piston rod through the detection rod and an outputting a detection signal thereof, and a control unit for calculating the best position for each said actuators according to an input information regarding the driving state of the automotive vehicle and the operating state of an engine thereof and outputting a processed signal thereof to the electromagnetic valve in order to control the electromagnetic valve and also feedback controlling the activation of the electromagnetic valve according to the detection signals received from the position switch and from the stroke sensor, the activation of the actuators being normally controlled according to the input signal from the stroke sensor but, when the stroke sensor is out of order, being controlled according to the input signal coming from the position switch.

11 Claims, 10 Drawing Sheets

ROUTINE OF STROKE SENSOR OUTPUT READING

ROUTINE OF SHIFT ACTUATOR OPERATION

ROUTINE OF SELECT ACTUATOR OPERATION

ROUTINE OF DETECTING NEUTRAL
(CONTROL REFERENCE POSITION)
WHEN ABNORMAL

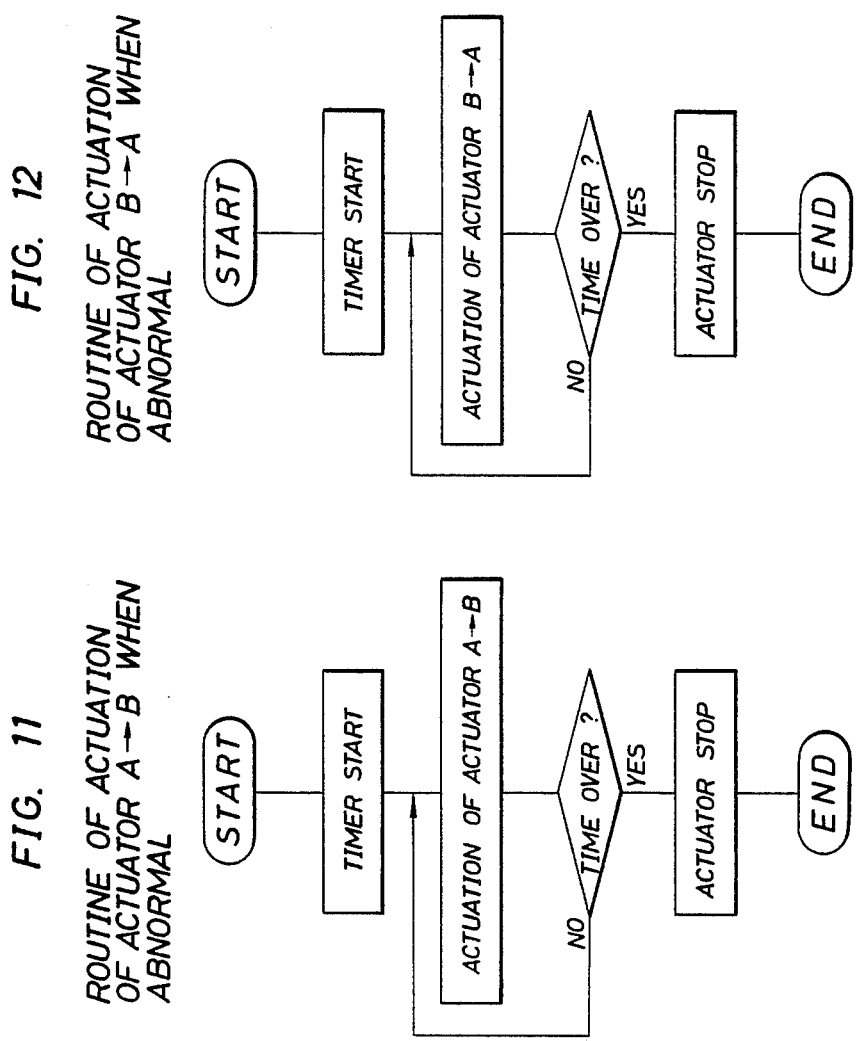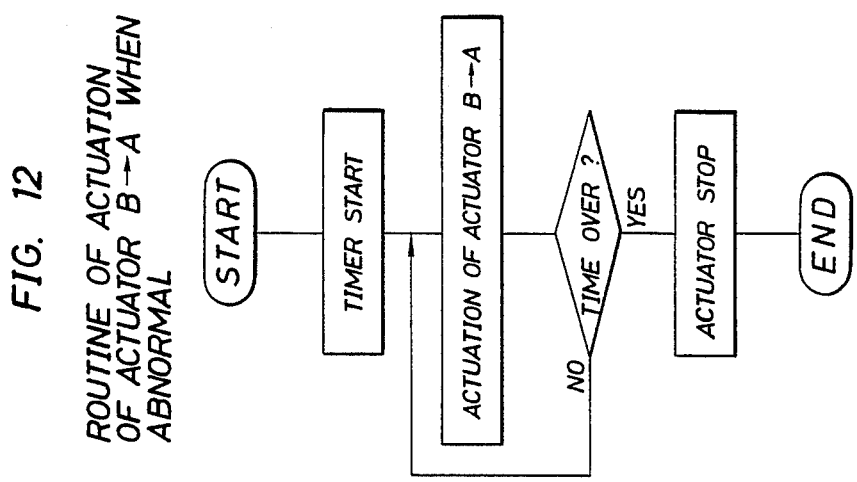

BACKUP CONTROL MEANS FOR SHIFT LEVER OF AN AUTOMATIC TRANSMISSION SYSTEMS

BACKGROUND OF THE INVENTION

1. Field of the Invention

This invention relates to a drive control apparatus of automatic transmission device for use in automotive vehicles, and more particularly, to a stroke sensor and a position switch capable of controlling a fluid pressure actuator installed in an automatic transmission device for use in automotive vehicles in which the stroke sensor, when in an abnormal state is backed up by the position switch to hastily actuate the fluid pressure actuator.

2. Description of the Prior Art

A conventional drive control apparatus of an automatic transmission device for use in automotive vehicles is disclosed, for example, in Japanese Patent Application Early Laid-open Publication No. Sho 58-177725 and includes a fluid pressure actuator comprising two hydraulic cylinders for displacing a shift lever in a shift direction and a select direction which are at right angles to each other, and an electromagnetic operation type direction control valve for supplying and discharging a hydraulic oil to and from the actuator, the control valve being automatically controlled through a hydraulic control circuit.

Furthermore, there was recently proposed a device, as disclosed for example in Japanese Patent Application Early Laid-open Publication No. Sho 62-137450 and Japanese Utility Model Application No. Sho 62-63194, which includes a fluid pressure actuator comprising a hydraulic cylinder, an electromagnetic valve for controlling the activation of the cylinder, a control unit with a microcomputer built therein for controlling the activation of the electromagnetic valve, and a position switch (or a stroke sensor capable of continuously detecting the displacement of the actuator) for detecting the displacement of the actuator and inputting a signal thereof into the control unit. The best position of the actuator is thereby obtained by calculation based on the input information, such as a position of an accelerator pedal, the number of rotations of an engine, etc. of automobile, which is to be input into the control unit, and a control signal thereof is output into the electromagnetic valve to automatically and remotely control the activation of the actuator.

However, this conventional drive control device, if the stroke sensor should become inoperable because of, for example, a wire cut trouble or the like, the controlling by the control unit would not work, which is very risky for a running automobile.

SUMMARY OF THE INVENTION

One object of the present invention is to provide a drive control apparatus of an automobile transmission device for use in automotive vehicles which, provided with a fluid pressure actuator, which includes a stroke sensor and a position switch able to control the actuator.

Another object of the present invention is to provide a drive control apparatus of an automatic transmission device for use in automotive vehicles, in which a stroke sensor capable of controlling a fluid pressure actuator is backed up by a position switch so that when the sensor is inoperable, the fluid pressure actuator can hastily be activated by the position switch.

A further object of the present invention is to provide a drive control apparatus of an automatic transmission device for use in automotive vehicles, in which the position switch is also used as a detect device of a fluid pressure actuator thus enabling a decrease in the number of component parts and a simplification of the construction.

A still further object of the present invention is to provide a drive control apparatus of an automatic transmission device for use in automotive vehicles which ensures safe driving of the automotive vehicle.

A further object of the present invention is to provide a drive control apparatus of an automatic transmission device for use in automotive vehicles which includes a control system capable of smoothly and automatically controlling a shift actuator and a select actuator for displacing a shift lever.

An additional object of the present invention is to provide a drive control apparatus of an automatic transmission device for use in automotive vehicles which includes a control system which continues to operate under an abnormal circumstance where, for example, one or both of stroke sensors provided to a shift actuator and a select actuator for displacing a shift lever are inoperable.

A drive control apparatus of an automatic transmission device for use in automotive vehicles includes a shift actuator and a select actuator comprising a pair of fluid pressure actuators capable of displacing a shift lever in a shift direction and a select direction which are at right angles to each other, a piston rod and a detection rod capable of being displaced for an equal amount with rrespect to each other by a working fluid which is to be supplied and discharged to and from the actuators, a plurality of electromagnetic valves for supplying and discharging a working fluid to and from the actuators according to a control signal, a position switch for withdrawably engaging in a detection groove formed in an outer periphery of the detection rod and, when engaged, detaining the piston rod and detecting a control reference position of the actuators and outputting a detection signal thereof, a stroke sensor for continuously detecting a displacement of the piston rod through the detection rod and outputting a detection signal thereof, and a control unit for calculating the optimal position for each of the actuators according to an input information regarding the driving state of the automotive vehicle and the operating state of an engine thereof and outputting a processed signal thereof to the electromagnetic valve in order to control the electromagnetic valve and also for feedback controlling the activation of the electromagnetic valve according to the detection signals received from the position switch and from the stroke sensor, the activation of the actuators being normally controlled according to the input signal from the stroke sensor but, when the stroke sensor is inoperable, being controlled according to the input signal coming from the position switch.

The above-mentioned and other objects, features and advantages of the present invention will become more apparent to those skilled in the art from the following detailed description with reference to the accompanying drawings.

BRIEF DESCRIPTION OF THE DRAWINGS

FIGS. 11 and 12 are flow charts showing the operation routines from A to B and from B to A of the actuators when the above-mentioned normal controlling does not work.

DETAILED DESCRIPTION OF THE PREFERRED EMBODIMENT

Figure 1:
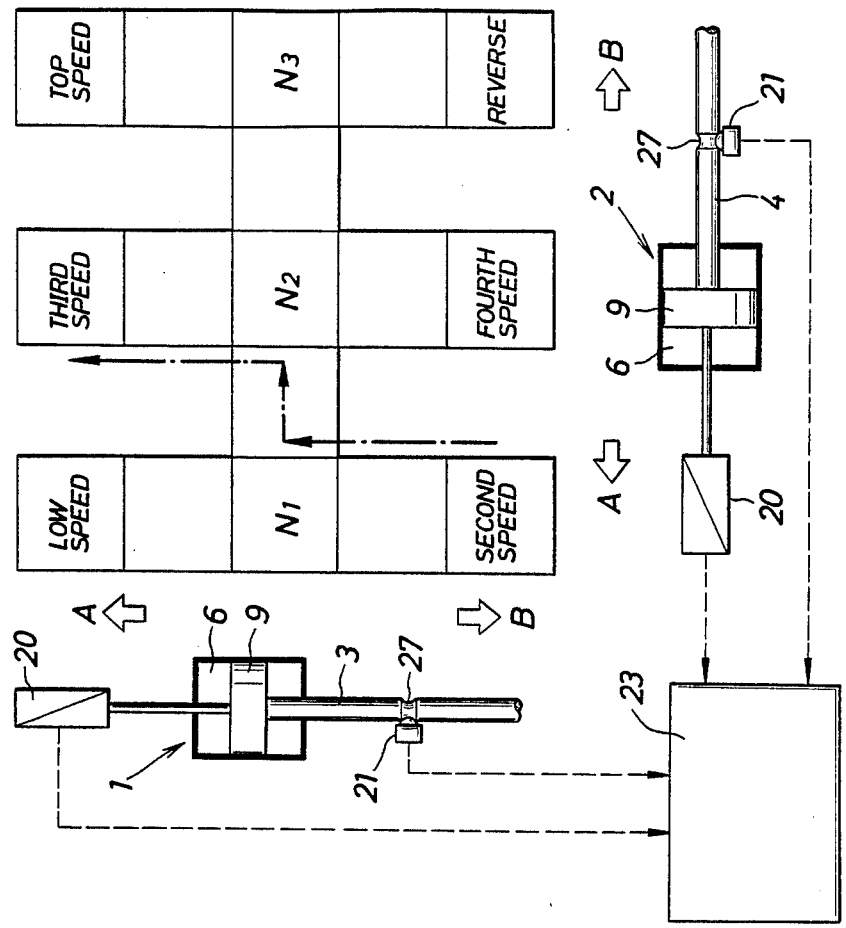
FIG. 1 is a schematic view showing one embodiment of the present invention.

One embodiment of the present invention will now be described with reference to the accompanying drawings. In FIGS. 1 through 12, reference numerals 1 and 2 respectively denote a shift actuator and a select actuator comprising a fluid pressure cylinder such as a hydraulic pressure, capable of displacing a shift lever not shown in a shift direction and a select direction which are at right angles to each other. Piston rods 3 and 4 thereof are provided with a generally C-shaped engaging piece and one aforementioned shift lever, both of which are of the types disclosed, for example, in Japanese Patent Application Early Laid-open Publication No. Sho 58-17772 and secured to the tips of the piston rods 3 and 4. One end of the lever is slidably engaged within the engaging piece.

These actuators are substantially of the same construction. For the sake of convenience, one such actuator 1 will be described. An actuator housing 5 thereof is formed therein with a rod inserting hole 7 having a diameter larger than that of a cylinder 6 and with another rod inserting hole 8 having a diameter smaller than that of the cylinder 6, the holes 7 and 8 being arranged in a coaxial direction. The piston rod 3 is slidably accommodated within the rod inserting hole 7.

A piston 9 is slidably accommodated within the cylinder 6. A detection rod 10 projecting from a larger pressure receiving area side of the piston 9 is slidably accommodated within the rod inserting hole 8. The housing 5 is formed therein with ftwo ports 11 and 12. The ports 11 and 12 are spaced apart from each other and communicate with the cylinder 6. The ports 11 and 12 are also communicate with oil passages 14 and 15 which communicate with a main oil passage 13. The main oil passage 13 communicates with a hydraulic pump (not shown) and an oil tank 16. The oil passage 13 is provided with first through third electromagnetic valves 17, 18 and 19.

The first electromagnetic valve 17 is a normally closed type valve, while the second and the third electromagnetic valves 18 and 19 are normally opened type valves. By opening the first valve 17 and closing the third valve 19, and by controlling the second valve 18 into either an opened position or a closed position, hydraulic oil is supplied into the two chambers which are defined by the cylinder 6, one at the left-hand side thereof and the other at the right-hand side thereof, do thereby move the piston 9 in the left-hand direction.

Similarly, by opening the first valve 17 and closing the second valve 18, and by controlling the third valve 19 into either an opened position or a closed position, hydraulic pressure within the cylinder 6 is released, but hydraulic pressure is introduced into the chamber at the other side thereof, i.e., the chamber at the smaller pressure receiving area side, do thereby move the piston 9 in the right-hand direction.

Displacement of the piston rod 3 can be detected by both a stroke sensor 20 and a position switch 21 as will be described. The stroke sensor 20 has a sensor rod 22 which can be moved together with the detection rod 10 and continuously detects the displacement of the piston rod 3 through the rod 22, a detection signal thereof being input into a control unit 23.

The control unit 23 is provided therein with a microcomputer. This microcomputer has input thereto various information regarding the operating state and the driving state of the engine such as, for example, signals of the number of rotation, the position of the accelerator pedal, etc. According to such input information, the microcomputer calculates optimum positions for the actuators 1 and 2 and outputs processed signals thereof to the first through the third electromagnetic valves 17, 18 and 19 as control signals, respectively.

On the other hand, the position switch 21 is disposed adjacent to the rod inserting hole 7, and a switch case 24 thereof accommodates therein a spring 25 and an engaging ball 26. The engaging ball 26 is normally urged against the peripheral surface of the piston rod 3 through the spring 25 and when the rod 3 is in a reference position such as a neutral position, etc., the engaging ball 26 is engaged in a detection groove 27 formed in the outer periphery of the rod 3 to detain the neutral position (reference position) of the rod 3.

The position switch 21 functions as a detect device of the piston rod 3. Also, the position switch 21 functions such that, when the engaging ball 26 is in engagement with the detection groove 27, the switch 21 closes a normally closed contact contained to input a reference position detecting signal in the control unit 23, whereas when the piston rod 3 is reciprocally moving, the engaging ball 26 and the detection groove 27 are brought out of engagement from each other to open the contact, thereby maintaining the switch 21 keeps in its off-position.

Therefore, the position switch 21 can compliment the operation of the stroke sensor 20 in by detecting the reference position of the piston rod 3. Therefore, even if the sensor 20 should become inoperative, the position switch 21 can undertake the operation of the sensor 20 and activate the control unit 23 and the respective first through third electromagnetic valves 17, 18 and 19 to move the piston rod 3 into three positions of a medium position, a right-hand side maximum stroke position and a left-hand side maximum stroke position by serving the above-mentioned reference position as a reference point, thus enabling the achievement of a hasty operation thereof.

Figure 4:
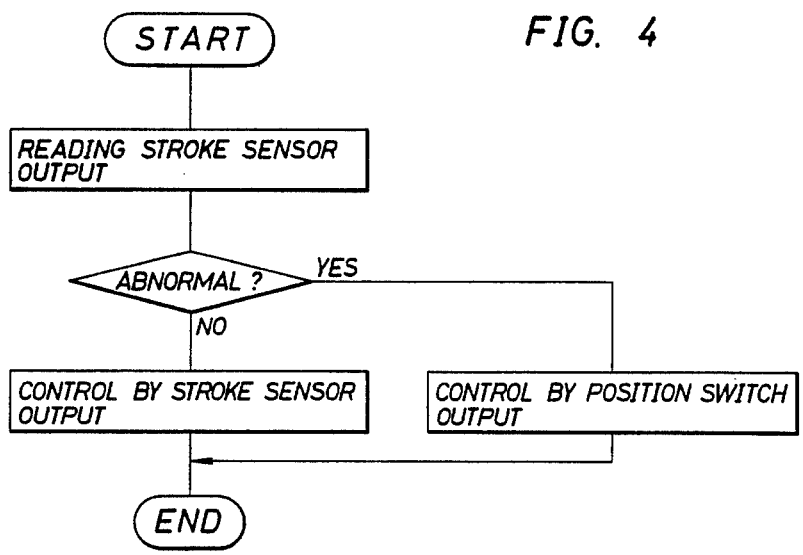
FIG. 4 is a flow chart showing the outline of the controlling of a fluid pressure actuator which is applied to the present invention.
Figure 5:
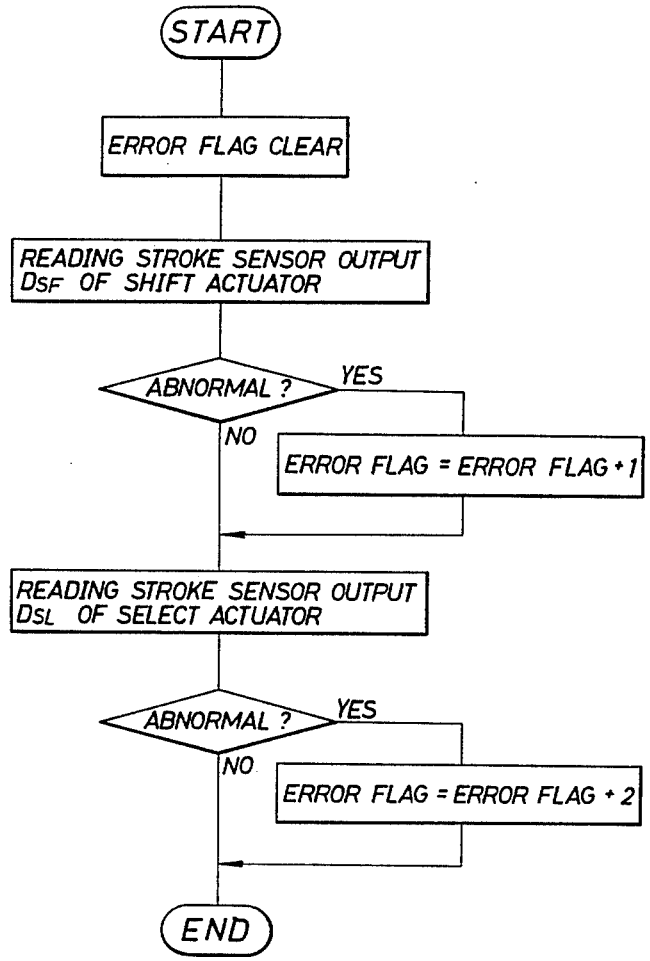
FIG. 5 is a flow chart showing the routine for reading a sensor output power of a stroke sensor which is used for controlling the above.

An operation flowchart of the control operation in such a cae is shown in FIG. 4. That is, upon the start of the control operation, the output power signals from the stroke sensors 20, 20 mounted on the actuators 1 and 2, i.e., the presence of the output power signals and the activating states, are read in order to judge whether the output power signals are normal. If the judgment is normal, a normal controlling cooperation according to the sensors 20, 20 is performed. On the contrary, if the judgment is abnormal, a controlling operation according to the position switches 21, 21 is performed. The reading of the output power signal of the stroke sensor 20 is carried out in the routine as shown in FIG. 5. Upon the start of the controlling operation, error flags of each sensor 20 are cleared beforehand and then, an output power signal $D_{SF}$ is read from the stroke sensor 20 of the shift actuator 1 in order to judge whether the output power signal $D_{SF}$ is normal.

And, if the judgment is normal, the routine proceeds to the next step. On the contrary, if the judgment is abnormal, an error flag 1 appears indicating that the output power signal $D_{SF}$ is abnormal and the routine proceeds to the next step where an output power signal $D_{SL}$ is read from the stroke sensor 20 of the select actuator 2 to judge whether the output power $D_{SL}$ is normal.

If the result is normal, the reading routine is finished. On the contrary, if the result is abnormal, an error flag 2 appears indicating that the output power $D_{SL}$ is abnormal and the routine is likewise finished.

In this case, the errors of each sensor 20 include such states as, for example, no output signal, abnormal signal level, etc. In this case, the judgment of the level is performed by comparing a reference level stored in the control unit 23 beforehand with the levels of signals input into the control unit 23 from each sensor 20.

The normal controlling operation according to the stroke sensor 20 calculates the optimal positions of the actuators 1 and 2 according to the various information input into the control unit 23, such as for example, the number of rotations of the engine, the position of the accelerator pedal, etc., then outputs processed signals thereof to the respective first through third electromagnetic valves 17, 18 and 19 as control signals, and then establishes again the optimal positions of the actuators 1 according to 2 through the electromagnetic valves 17, 18 and 19 and input information from the stroke sensor 20 to the control unit 23, thereby providing feed back control in establishing the above-mentioned optimal position.

Also, the controlling operation according to the position switch 21 is such that the actuator 1 or 2 corresponding to the normal sensor 20 is permitted to remain activated and the reference position (neutral position or $N_2$ position) of the remaining actuator 1 or 2 corresponding to the abnormal sensor 20 is detected by the position switch 21 instead of the stroke sensor 20 so as to activate the actuator for a predetermined amount with reference to the detected position.

Figure 6:
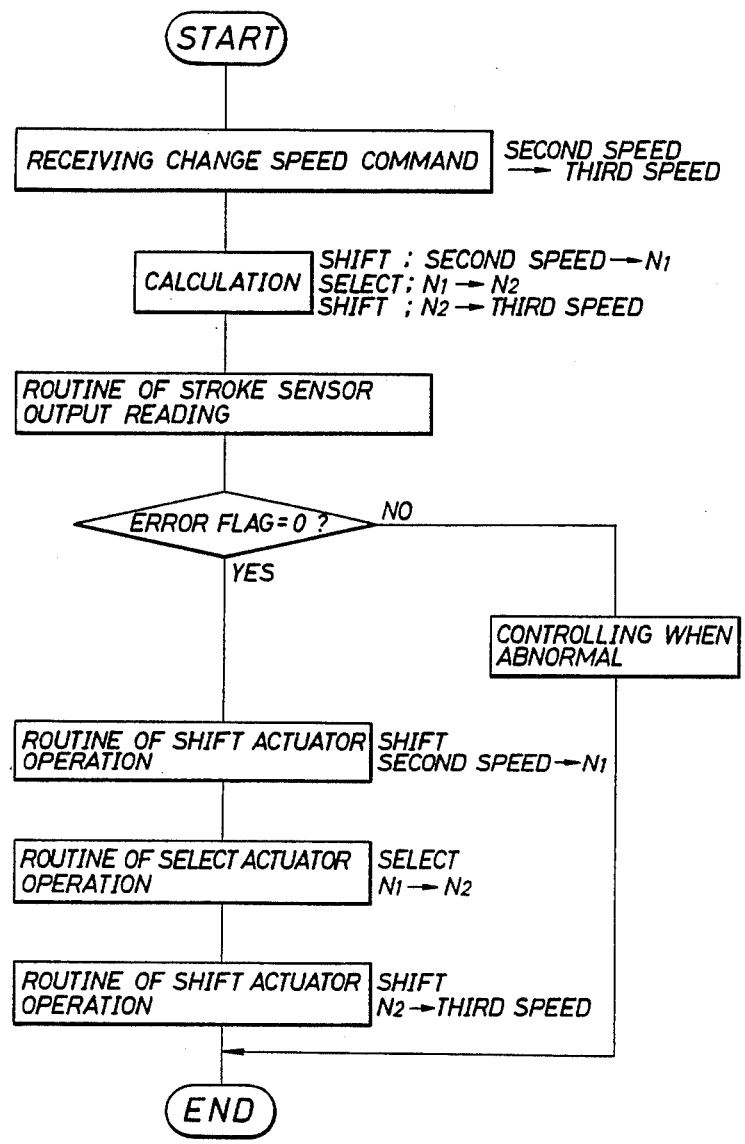
FIG. 6 is a flow chart showing the outline of a change-speed controlling by a fluid pressure actuator which is applied to the present invention.

For example, when the change speed ratio is to be changed from the second speed to the third speed, it is controlled in accordance with the routine as shown in FIG. 6. That is, upon the start of the controlling operation, the control unit 23 receives a speed change command from the second speed to the third speed and calculates the activating processes and positions of the shift actuator 1 and the select actuator 2 and a displacing amount required for them according to the command, and then outputs the result of the processing to the first through third electromagnetic valves 17, 18 and 19 of the actuators 1 and 2 as control signals.

The control signals have the tasks of displacing the actuator 1 from the second speed to $N_1$ and the other actuator 2 from $N_1$ to $N_2$ and thereafter, displacing the actuator 1 from $N_2$ to the third speed.

The control unit 23 then reads the output power from each stroke sensor 20 in accordance with the above-mentioned routine and judges whether errors are present. If the control unit 23 judges that errors are not present, it actuates the actuator 1, the actuator 2, and the actuator 1 in this order to establish the desired change speed.

Figure 7:
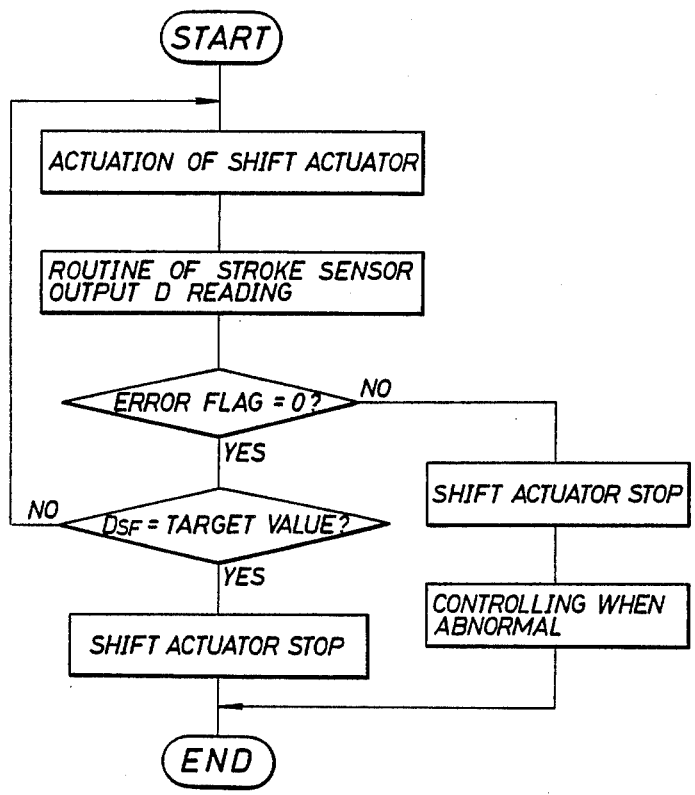
FIG. 7 is a flow chart showing the activation routine of a shift actuator which is used for controlling the above.

The shift actuator 1, when a sensor output power thereof is normal, is controlled so that its activation is in accordance with the routine as shown in FIG. 7 according to the aforementioned control signals output from the control unit 23.

That is, upon the start of the controlling operation, the actuator 1 is actuated by the first through third electromagnetic valves 17, 18 and 19 which are drive controlled by the aforementioned control signals, and the displacing amount of the piston rod 3 at that time is detected by the stroke sensor 20. Then, the detected results are sequentially input into the control unit 23 as detection signals.

The control unit 23 reads the input signals in accordance with the routine as shown in FIG. 5 and judges whether the activation is normal. If the judgment is normal, the control unit 23 then judges whether the displacing amount of the actuator 1 reaches the target value. If the result of this judgment is yes, the control unit 23 outputs stop signals to the first through third electromagnetic 17, 18 and 19 to stop the shift actuator 1.

In this case, the judgment of the target value is performed by comparing the output power $D_{SF}$ with a reference value stored in the control unit 23.

The actuator 1 is activated twice in the manner as mentioned. In the first activation, the actuator 1 is displaced from the second speed to $N_1$ and in the second activation, it is displaced from $N_2$ to the third speed. Therefore, target values corresponding to those displacing amounts are already stored in the control unit 23.

On the other hand, if the activation is judged as abnormal during the controlling process of the actuator 1, the control unit 23 outputs a stop signal to the respective electromagnetic valves 17, 18 and 19 and stops the activation of the actuator 1. Then, it proceeds to a step where the controlling operation is performed when abnormal as will be described later.

Figure 8:
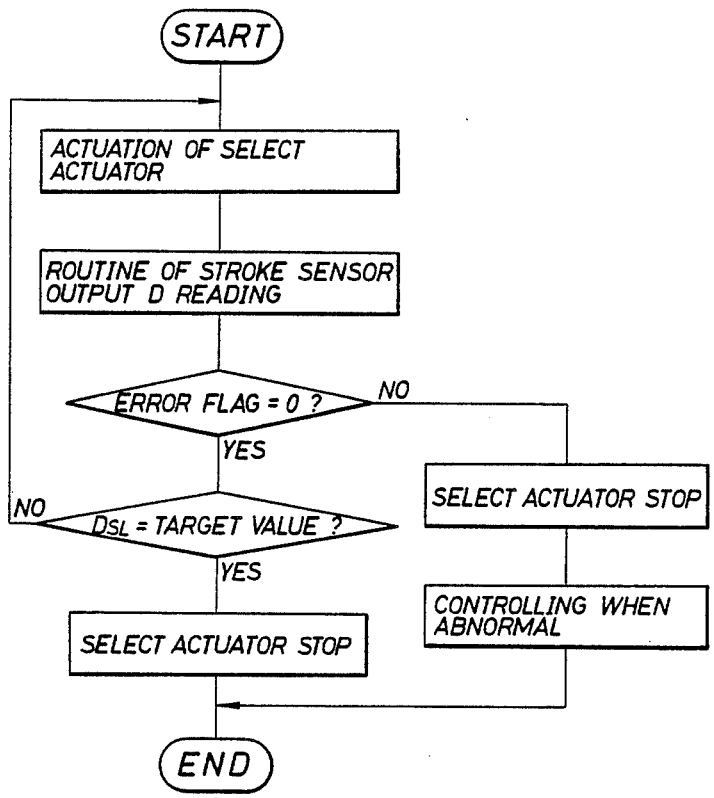
FIG. 8 is a flow chart showing the activation routine of a select actuator which is used for controlling the above.

Next, with regard to the select actuator 2, if a sensor output power thereof is normal, the activation thereof is controlled in accordance with the afore-mentioned control signals output from the control unit 23 in accordance with the routine as shown in FIG. 8. The details of the controlling operation are substantially the same as those of the actuator 1 mentioned above.

If the sensor output power of each stroke sensor 20 is abnormal, it automatically goes proceeds to a step where the abnormal-time controlling operation is performed by the position switch 21.

Figure 9:
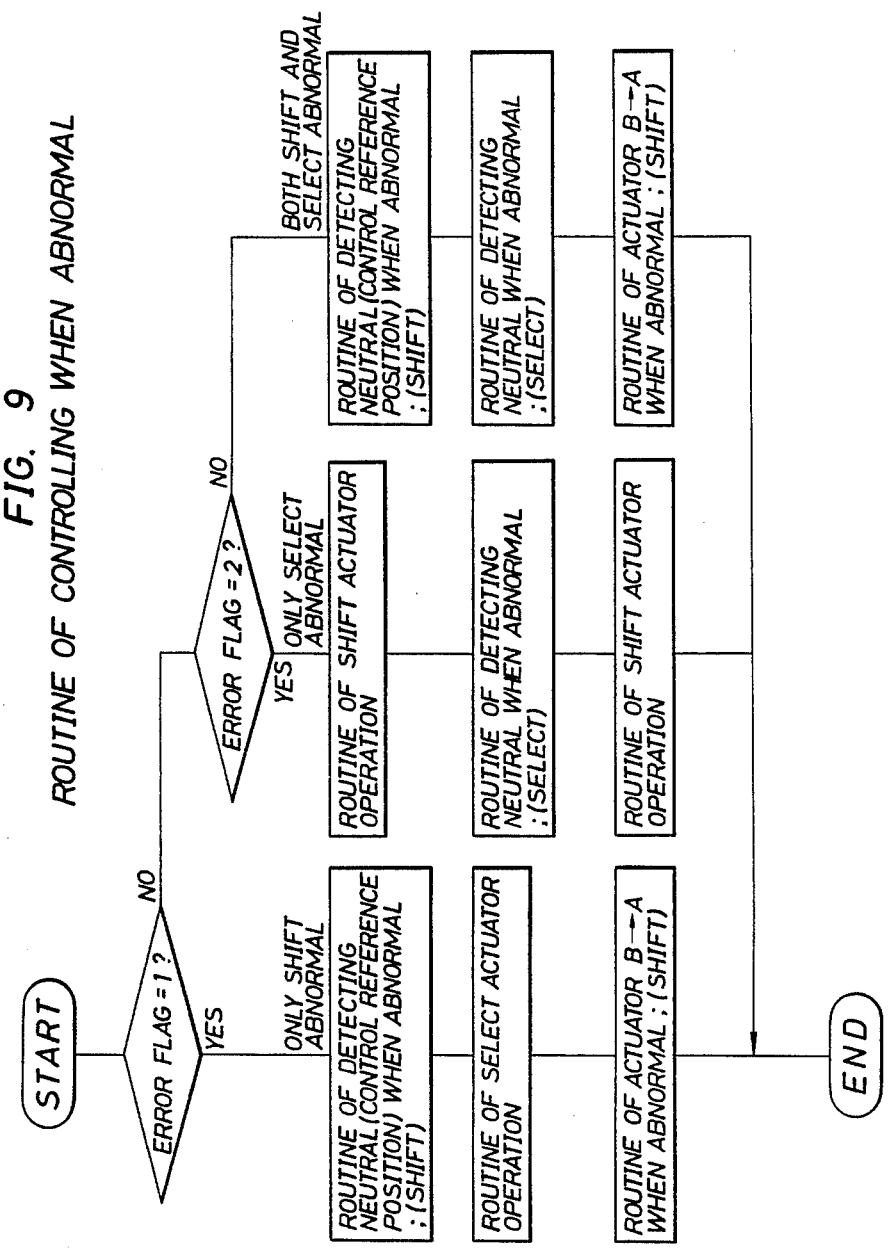
FIG. 9 is a flow chart showing the control routine when the above-mentioned normal controlling operation does not work.

That is, the abnormal-time controlling operation is performed in accordance with the routine as shown in FIG. 9. The details of the controlling operation are different depending on the kind of errors during the reading process of the sensor output power of the stroke sensor 20.

If the details are to be largely classified, there is one case where only the sensor 20 of the shift actuator 1 is abnormal, in other words, one case where the error flag 1 is present and only the sensor 20 of the select actuator 2 is abnormal, and there is another case where the error flag 2 is present and both the sensors 20, 20 are abnormal.

In case only the sensor 20 of the shift actuator 1 is abnormal and therefore, in case the sensor 20 of the select actuator 2 is normal, the control reference position of the actuator 1 at the abnormal side, in other words, the neutral position is detected first.

Figure 10:
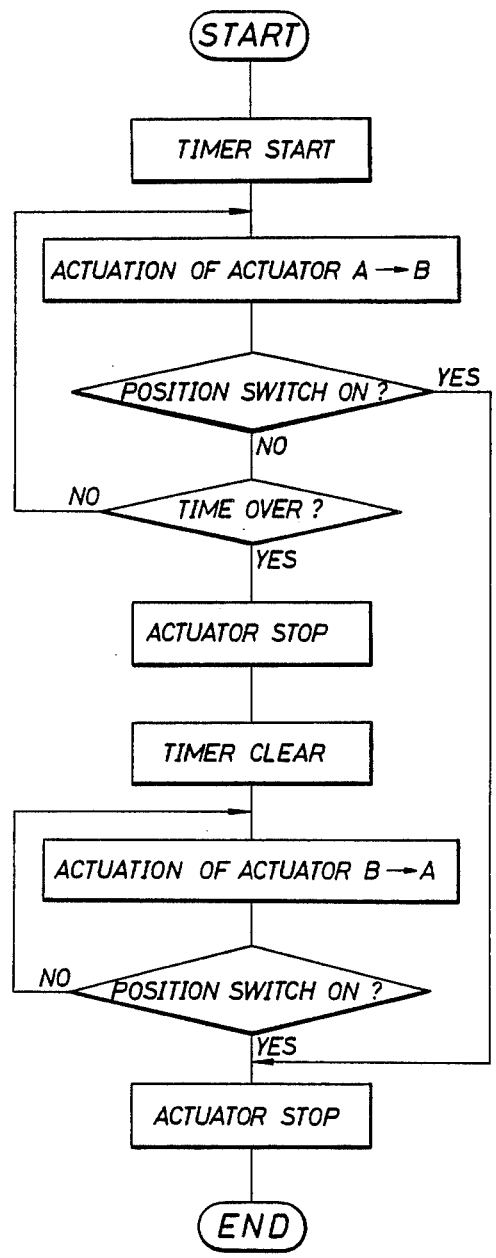
FIG. 10 is a flow chart showing the detection routine for detecting a neutral position (reference position) of the actuators during the procedure when the above-mentioned normal controlling operation does not work.

The detection of the neutral position is performed in accordance with the routine as shown in FIG. 10. Upon start of the controlling operation, a timer for regulating the detecting time is actuated. At the same time, the actuator 1 is displaced from the end A toward the end B of FIG. 1.

Furthermore, the reference position of the actuator 1 is detected depending on whether the position switch 21 is actuated or switched on at this displacement process, in other words whether the engaging ball 26 of the switch 21 is engaged with the detection groove 27 formed in the piston rod 3, and if the switch 21 is detected to be actuated or switched on, the detection of the neutral position is finished to stop the actuator 1. Accordingly, the routine is finished.

This detection procedure is continued during the established time of the timer. If the neutral position has not been detected in the established time, the actuator 1 is stopped from displacing in the above-mentioned direction because the time period is over and the timer is cleared.

From the above-mentioned results, it is known that the neutral position can be detected by displacing the actuator 1 in a direction opposite to the above-mentioned direction. And, when the actuator 1 has been displaced from the end B in the direction A and the position switch 21 has been actuated or switched on, the actuator 1 is stopped. This routine is finished in the state where the neutral position is detained, in other words, where it is set to the $N_1$ position.

When the detecting procedure of the neutral position of the shift actuator 1 has been completed the select actuator 2 is then activated in accordance with the routine shown in FIG. 8 and the switching operation from $N_1$ to $N_2$ is performed. In this case, since the stroke sensor 20 of the actuator 2 is normally activated as mentioned above, the above-mentioned activation is performed by the sensor 20. At this activating time, the neutral position of the actuator 1 is also detained.

Thereafter, the shift actuator 1 is activated again so that it is displaced from the end B in the direction A, thereby to switch from the $N_2$ position to the third position. In this case, the actuator 1 is actuated by the position switch 21 in the same manner as already described. In this case, the activation of the actuator 1 is controlled in accordance with the routine shown in FIG. 12.

That is, in this routine, upon the start of the controlling, the timer for regulating the activating time is actuated and at the same time, the actuator 1 is activated from the end B in the direction A during the set time, to thereby make it a full stroke.

This situation can be known from the fact that the engaging ball 26 of the position switch 21 is disengaged from the detection groove 27 and the switch 21 is switched off. At almost the same time when this situation is created, it is judged whether the timeover of the set time is present. In case the result of this judgment is timeover, the actuator 1 is caused to stop activating to thereby complete this routine.

Therefore, since the displacement of the actuator 1 is controlled by the timer in this routine, for example, the set time can be varied and in addition, various kinds of setting can be obtained which are not limited to the above-mentioned full stroke.

Next, in the case where only the sensor 20 of the select actuator 2 is abnormal and therefore in the case the sensor 20 of the shift actuator 1 is normal, since the activation of the normal actuator 1 can precede, the actuator 1 is precedingly activated using the stroke sensor 20 to shift the speed from the second speed to $N_1$ in accordance with the routine of FIG. 7.

Thereafter, the actuator 2 at the abnormal side is shifted to the control reference position, i.e., to the $N_2$ position. The detection of the control reference position $N_2$, i.e., the establishment, is performed in accordance with the routine shown in FIG. 10 in the same manner as in the case with the shift actuator 1. After this detection, the shift actuator 1 is actuated by making use of the stroke sensor 20 in accordance with the routine of FIG. 7 and shifted from $N_2$ to the third speed.

On the other hand, in the case where the two stroke sensors of the actuators 1 and 2 are abnormal, the respective actuators 1 and 2 is established to the control reference position, in other words, to the neutral portion or $N_2$ position to attained the purpose with reference to the routine shown in FIG. 10. By performing this in the order of the actuator 1 first and then the other actuator 2, the speed can be shifted from the second speed to $N_2$.

Figure 2:
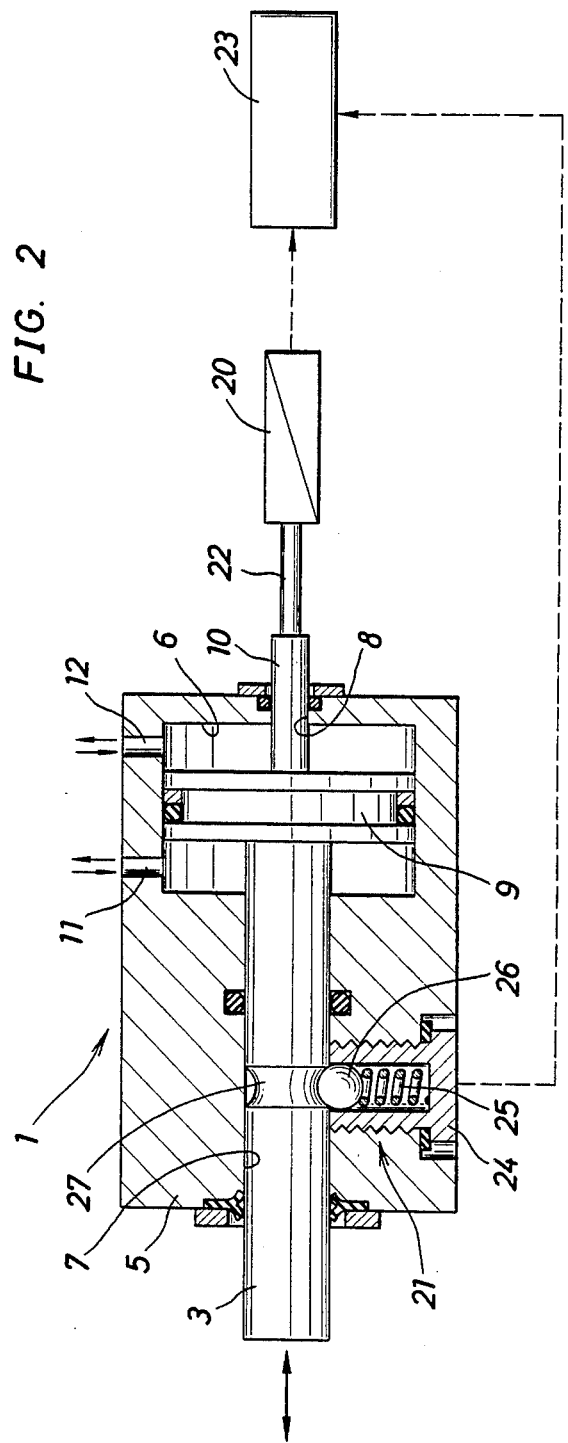
FIG. 2 is a sectional view showing an important portion of the present invention.
Figure 3:
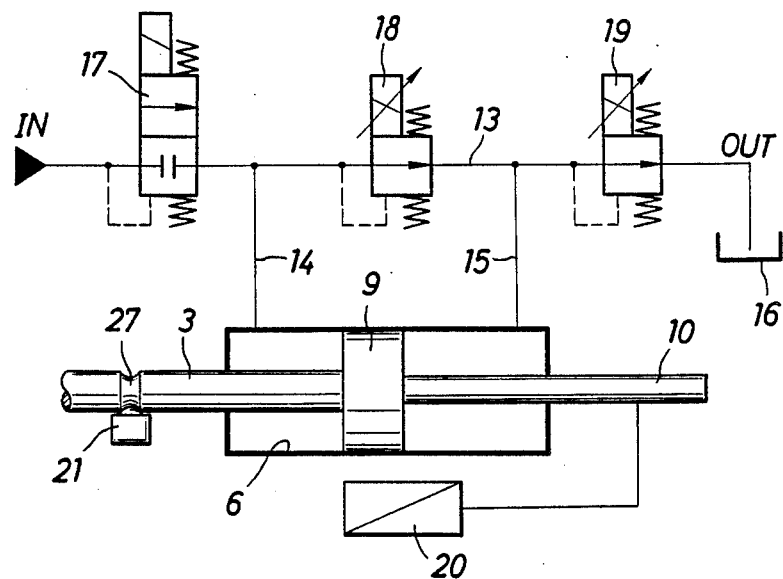
FIG. 3 is a hydraulic circuit diagram showing an important portion of the present invention.

Thereafter the shift actuator 1 is actuated in accordance with the routine shown in FIGS. 1 and 2, and the speed is shifted from $N_2$ to the third speed.

FIG. 11 shows a control routine which is effective to actuate the actuators 1 and 2 in order to shift the speed in the opposite manner as that of the above-mentioned case, i.e., from, for example, the third speed to the second speed, and the details thereof are substantially the same as those of FIG. 12.

As described in the foregoing, since the present invention includes a stroke sensor and a position switch capable of controlling a fluid pressure actuator mounted on an automatic transmission device and the stroke sensor is compensated through said switch, even if said sensor should become inoperable, it can be backed up by the position switch thus enabling the actuator.

Further, in the present invention, since the fluid pressure actuator can be detained in a predetermined position by the position switch, said switch can also be used as a detect device. Therefore, a device solely for the use of detect is not required unlike in the case with the prior art and thus, the number of component parts can be reduced and the construction can be simplified.

Furthermore, in the present invention, upon the start of the change speed controlling operation, it is detected whether the stroke sensor mounted on each fluid pressure actuator is normal, and when the sensor is detected to be normal, the controlling by the stroke sensor is permitted, but when the sensor is detected to be abnormal, it is automatically shifted to the controlling by making use of the position switch under an abnormal circumstance. Accordingly, a hasty running of an automotive vehicle is available under an abnormal circumstance and therefore, safety of the vehicle is ensured.

What is claimed is:

1. A drive control apparatus of an automatic transmission system of an automotive vehicle for displacing a shift lever of the automatic transmission system in a shift direction and a select direction which are at right angles to each other, said drive control apparatus comprising:
   (a) a shift actuator and a select actuator, each of said shift actuator and said select actuator comprising,
      (i) a fluid pressure actuator,
      (ii) a piston rod and a detection rod arranged to be displaced an equal amount with respect to each other in response to a working fluid being supplied to and discharged from said fluid pressure actuator, said piston rod operatively connectable to the shift lever,
      (iii) a plurality of electromagnetic valve means for supplying and discharging said working fluid to and from said fluid pressure actuator according to a control signal, and,
      (iv) a position switch means for withdrawably engaging in a detection grove formed in an outer periphery of said detection rod, and for outputting a reference position signal when engaged in said detection grove;
   (b) first and second stroke sensor means for continuously detecting a displacement of said detection rod of said shift actuator and said select actuator, respectively, and for outputting corresponding first and second displacement detection signals, respectively; and,
   (c) control means, coupled to said first and second stroke sensor means and said position switch means of each of said shift actuator and said select actuator, for calculating an optimal operating position of each of said shift actuator and said select actuator according to an operating state of the automotive vehicle, and for outputting said control signal to said electromagnetic valve means of each of said shift actuator and said select actuator according to the thus calculated optimal operating position of each of said shift actuator and said select actuator, and according to said first and second displacement detection signals respectively output by said first and second stroke sensor means when said first and second stroke sensor means are operable, and according to said reference position signal of said position switch of at least one of said shift actuator and said select actuator when a corresponding one of said first and second stroke sensor means is inoperable.

2. A drive control apparatus as recited in claim 1, wherein said fluid pressure actuator of each of said shift actuator and said select actuator is a differential cylinder.

3. A drive control apparatus as recited in claim 1, the inoperability of each of said first and second sensor means being detected by said conftrol means with reference to a sensor output power signal output by each of said first and second stroke sensor means.

4. A drive control apparatus as recited in claim 2, the inoperability of each of said first and second sensor means being detected by said control means with reference to a sensor output power signal output by each of said first and second stroke sensor means.

5. A drive control apparatus as recited in claim 3, wherein upon at least one of said first and second stroke sensor being detected as inoperable, said control means outputs a stop signal to said electromagnetic valve means of a corresponding one of said shift actuator and said select actuator to stop the activation thereof.

6. A drive control apparatus as recited in claim 4, wherein upon at least one of said first and second stroke sensor being detected as inoperable, said control means outputs a stop signal to said electromagnetic valve means of a corresponding one of said shift actuator and said select actuator to stop the activation thereof.

7. A drive control apparatus as recited in claim 3, wherein said control means calculates activating processes of said fluid pressure cylinders, activating positions thereof and displacing amounts thereof in accordance with a change speed command received from within the automotive vehicle.

8. A drive control apparatus as recited in claim 1, wherein when only one of said first and second stroke sensor means is detected a being inoperable, said control means controls activation of a corresponding one of said shift actuator and said select actuator according to said reference position signal output by a corresponding one of said position switch means, and said control means controls activation of the other one of said shift actuator and said select actuator according to one of said first and second displacement detection signals of an operable one of said first and second stroke sensor means.

9. A drive control apparatus as recited in claim 2, wherein when only one of said first and second stroke sensor means is detected a being inoperable, said control means controls activation of a corresponding one of said shift actuator and said select actuator according to said reference position signal output by a corresponding one of said position switch means, and said control means controls activation of the other one of said shift actuator and said select actuator according to one of said first and second displacement detection signals of an operable one of said first and second stroke sensor means.

10. A drive control apparatus as recited in claim 3, wherein when only one of said first and second stroke sensor means is detected a being inoperable, said control means controls activation of a corresponding one of said shift actuator and said select actuator according to said reference position signal output by a corresponding one of said position switch means, and said control means controls activation of the other one of said shift actuator and said select actuator according to one of said first and second displacement detection signals of an operable one of said first and second stroke sensor means.

11. A drive control apparatus as recited in any one of claims 1-10, wherein upon detection of an inoperability of at least one of said first and second stroke sensor means, said control means activates a corresponding one of said shifft actuator and said select actuator to cause a continuous displacement of said piston rod in a first direction until either a predetermined period of time has expired or said reference position signal is output by said position switch means, and, in the case where said predetermined period of time has expired, said control means controls said corresponding one of said shift actuator and said select actuator to cause said piston rod to continuously be displaced in an opposite direction until said reference position signal is output by said position switch means.

* * * * *